US010259012B2

(12) United States Patent
Robertson et al.

(10) Patent No.: US 10,259,012 B2
(45) Date of Patent: *Apr. 16, 2019

(54) SIFTING SCREEN

(75) Inventors: Graham Robertson, Fife (GB); Brian Carr, Burlington, KY (US); Eric Cady, Florence, KY (US)

(73) Assignees: M-I L.L.C., Houston, TX (US); M-I Drilling Fluids U.K. Ltd, Aberdeen (GB)

( * ) Notice: Subject to any disclaimer, the term of this patent is extended or adjusted under 35 U.S.C. 154(b) by 110 days.

This patent is subject to a terminal disclaimer.

(21) Appl. No.: 12/996,832

(22) PCT Filed: Jul. 8, 2009

(86) PCT No.: PCT/GB2009/050804
§ 371 (c)(1),
(2), (4) Date: Mar. 1, 2011

(87) PCT Pub. No.: WO2010/004327
PCT Pub. Date: Jan. 14, 2010

(65) Prior Publication Data

US 2011/0284455 A1 Nov. 24, 2011

(30) Foreign Application Priority Data

Jul. 10, 2008 (GB) .................................. 0812630.2

(51) Int. Cl.
*B07B 1/46* (2006.01)
*B01D 39/12* (2006.01)

(52) U.S. Cl.
CPC ............. *B07B 1/46* (2013.01); *B07B 1/4663* (2013.01)

(58) Field of Classification Search
CPC ...... B01D 33/0376; B01D 39/12; B07B 1/46; B07B 1/4645; B07B 1/4618; B07B 1/4636; B07B 1/4663; B07B 1/469
(Continued)

(56) References Cited

U.S. PATENT DOCUMENTS 2,201,083 A 5/1940 Evenson
4,674,251 A 6/1987 Wolff
(Continued)

FOREIGN PATENT DOCUMENTS

AU 199889516 B2 1/1999
DE 3542635 C1 2/1987
(Continued)

OTHER PUBLICATIONS

Search Report in GB 0812630.2 dated Jul. 11, 2008.
(Continued)

*Primary Examiner* — Madeline Gonzalez
(74) *Attorney, Agent, or Firm* — Paula B. Whitten

(57) ABSTRACT

The invention relates to a screen frame adapted for use in a shaker and to which woven wire mesh is to be attached, comprising an outer perimeter and a plurality of plastics ribs extending between opposing regions of the perimeter, the frame being arranged such that, when fitted in a shaker to which it is adapted for, a portion of the opposing regions is clamped in place and a portion of the opposing regions is not clamped with the number of plastics ribs per unit length for the clamped portion greater than the number of plastics ribs per unit length for the unclamped portion, and to a shaker comprising at least one such screen frame.

16 Claims, 2 Drawing Sheets

(58) Field of Classification Search

USPC ....... 210/499, 498, 485, 495, 384, 388, 389; 209/405, 412, 409

See application file for complete search history.

(56) References Cited

U.S. PATENT DOCUMENTS

| | | | | |
|---|---|---|---|---|
| 5,971,159 | A * | 10/1999 | Leone et al. | 209/399 |
| 6,267,246 | B1 | 7/2001 | Russell et al. | |
| 7,216,768 | B2 * | 5/2007 | Fisher et al. | 209/395 |
| 2002/0033358 | A1 | 3/2002 | Bakula | |
| 2005/0224398 | A1 * | 10/2005 | Largent | B01D 33/0376 209/403 |
| 2006/0180509 | A1 * | 8/2006 | Burnett | B01D 33/0376 209/405 |
| 2007/0221547 | A1 * | 9/2007 | Robertson | B01D 33/0093 209/399 |
| 2008/0078703 | A1 | 4/2008 | Robertson | |
| 2008/0083660 | A1 | 4/2008 | Gallia | |

FOREIGN PATENT DOCUMENTS

| | | | |
|---|---|---|---|
| DE | 3545635 | A1 | 6/1987 |
| GB | 1372686 | | 11/1974 |
| GB | 2421206 | A | 6/2006 |
| GB | 2422125 | A | 7/2006 |
| WO | WO-01/017659 | A1 | 3/2001 |
| WO | 2003/057376 | A1 | 7/2003 |
| WO | WO-03/057375 | A1 | 7/2003 |
| WO | 2004035234 | | 4/2004 |
| WO | 2004/098798 | A1 | 11/2004 |
| WO | WO-2004/098798 | A1 | 11/2004 |
| WO | WO-2004/101107 | A1 | 11/2004 |
| WO | 2006064222 | | 6/2006 |
| WO | 2008038014 | | 4/2008 |

OTHER PUBLICATIONS

Written Opinion in PCT/GB2009/050804 dated May 10, 2009.

Canadian Office Action for corresponding Canadian Application Serial No. 2,728,543 dated Sep. 1, 2015, 4 pages.

International Search Report and Written Opinion for the equivalent International patent application PCT/GB2009/050804 dated Oct. 5, 2009.

International Preliminary Report on Patentability for PCT/GB2009/050804 dated Jan. 11, 2011.

Office Action for the equivalent Canadian patent application 2728543 dated Sep. 1, 2015.

Communication pursuant to Article 94(3) for the equivalent European patent application 09785284.2 dated Jan. 19, 2018.

* cited by examiner

SIFTING SCREEN

FIELD OF THE INVENTION

The invention relates to sifting screens which in use are fitted to a shaker to separate solids from liquids and in particular to separate solids from liquid drilling muds brought up from down-hole when drilling for oil or gas.

BACKGROUND TO THE INVENTION

Efficiently separating solids from liquids is a widespread technical problem. One of the most practical and robust methods of achieving this remains the use of a sieve, or screen, to sift the solids from the mixture of liquid and solid.

When drilling for oil and/or gas, synthetic drilling fluids, or muds, are used. As these muds are relatively expensive to manufacture, once used they are typically recovered in a process including sifting rock, shale and other debris from the mud. This involves the use of a so-called shaker which has fitted, one or more sifting screens, made up of a screen frame with one or more sheets of woven wire mesh, or screen, stretched over and secured to it. In use, the shaker vibrates the sifting screen or screens, to aid the sifting process.

In order for such sifting screens to be able to withstand the rigours of such a process, they must have a certain rigidity and be very hard-wearing. This has resulted in a design of sifting screen having a screen frame which has a plurality of reinforcing "ribs". A common design of screen frame is rectangular comprising an outer rectangular perimeter with each side connected to its opposing side by a plurality of ribs. Such a design results in a plurality of rectangular openings. Typically the screen is attached not only to the rectangular perimeter but also to the ribs, to provide better adhesion of the screen to the frame and prolonging its lifetime.

In use the long sides of the perimeter are often clamped in position, leaving the short sides unclamped. The direction of bulk flow of the liquid/solid mixture is substantially parallel to the clamped sides.

The rectangular openings are arranged such that the long dimension of the rectangular openings is substantially parallel to the direction of bulk flow of the liquid/solid mixture passing over the screen. This is because it is believed that the solids will slow down when passing over a rib and so the fewer transverse ribs there are to pass over the less erratic will be the motion of the solids. This has the effect that the number of plastics ribs per unit length extending between clamped sides is less than the number of plastics ribs per unit length extending between unclamped sides.

In view of the fact that sifting screens are man-handled into position, such screen frames have for some time been made from plastics material to reduce weight. A common design of plastics screen frame is reinforced by including a metal wire structure, embedded within the plastics rectangular perimeter and rib arrangement.

However, despite the measures taken to provide sufficient rigidity, the present inventors have found that vibratory motion typically involved in shakers is not successfully transmitted by the screen frame to the attached screen. Excessive motion of screens has been observed, known as "whipping", which can result in erratic solids conveyancing and premature screen failure.

SUMMARY OF THE INVENTION

The present invention relates to a screen frame adapted for use in a shaker and to which woven wire mesh is to be attached, comprising an outer perimeter and a plurality of plastics ribs extending between opposing regions of the perimeter, the frame being arranged such that, when fitted in a shaker to which it is adapted for, a portion of the opposing regions is clamped in place and a portion of the opposing regions is not clamped, with the number of plastics ribs per unit length of the clamped portion greater than the number of plastics ribs per unit length of the unclamped portion.

It has been found by the present inventors that arranging for a greater density of plastics ribs extending between the clamped portion than run between the unclamped portion, provides increased rigidity without necessarily increasing the weight of the screen frame.

Preferably the frame has a perimeter consisting of four sides, e.g. rectangular, the plastics ribs extending between both pairs of sides, forming a plurality of rectangular openings.

In a preferred embodiment, the screen frame has a wire mesh attached to it, comprising a network of orthogonal wires with a spacing much less than that between the plurality of plastics ribs.

In use, at least one frame according to the invention is forced to vibrate in an upwards and downwards sense by the shaker it is fitted in. The liquid/solid mixture to be separated is then passed across the at least one frame according to the invention, generally from one side of the rectangular perimeter to the opposing side. This vertical vibrating motion is also accompanied by lateral motion in the direction of passage of the liquid/solid mixture. This lateral motion may be in phase with the vertical motion to produce a diagonal motion of the frame, moving in the same general direction as the direction of the passing liquid/solid mixture as the frame moves upwards. Alternatively, the lateral motion may be out-of-phase with the vertical motion, e.g. to provide an elliptical motion of the frame. Consequently, the frame moves in the opposite general direction of the passing liquid/solid mixture as the frame moves downwards. The motion of the frame may conveniently be approximately 45° to vertical.

If the frame is rectangular then preferably it is clamped along its long sides, for increased rigidity.

Most commonly the lateral vibrating motion of the frame in use is parallel with the clamped sides of the rectangular frame, so that the solids flow is also parallel to the clamped sides. However it is also possible that the lateral vibrating motion in use is orthogonal to the clamped sides.

The perimeter is preferably made of plastics, e.g. GRP plastics and has a thickness, extending from the upper face to the lower face of from 3 to 8 cm. The plastics ribs are preferably made from the same material as the perimeter for simplicity, and preferably also have substantially the same thickness, providing a well-defined upper face and a lower face to the frame.

When rectangular the perimeter may comprise long sides having a length of, for example, from 40 to 100 cm and short sides having a length of, for example, from 20 to 70 cm, and will have dimensions chosen so as to fit snugly into the particular shaker it is adapted for use in.

In a preferred embodiment, the frame is clamped along its long sides and the solids flow is parallel to the clamped sides. Thus, the solids will have to pass over a greater number of transverse ribs than in the prior art. However, it has been surprisingly found that this does not make the solids motion noticeably more erratic.

Typically the ratio of the number of plastics ribs per unit length between clamped portions to the number of plastics ribs per unit length between unclamped portions is from 1.1:1 to 10:1, preferably from 1.5:1 to 5:1, more preferably from 2:1 to 4:1.

The number of ribs extending between clamped sides may be from 15 to 30 per meter, and the number of ribs between unclamped sides may be from 3 to 15 per meter.

To further increase its rigidity, the screen frame may also comprise at least one metal rib extending between opposing, clamped regions of the perimeter.

Having more metal ribs has been found to give increased rigidity, however at increasing weight.

Preferably therefore, the frame comprises from one to five metal ribs, preferably from two to four metal ribs. Three metal ribs have been found to provide a good optimum rigidity without excessive weight increase.

The ends of the metal ribs ideally are located at or within the perimeter material to give optimal rigidity. However, the ends could fall short of the perimeter by a small distance, provided that another material was employed to connect the metal ribs to the perimeter. Generally the at least one metal rib will traverse at least 90% of the distance between the opposing regions it extends between.

The at least one metal rib also extends from the upper face to the lower face. Preferably the at least one metal rib extends from 50% to 100% of the distance from the upper face to the lower face, more preferably from 60% to 90%.

The at least one metal rib is typically straight with a constant rectangular cross-section. The length of the sides of the rectangular cross-section extending between the upper and lower faces is preferably much greater than the short sides of the rectangular cross-section. Having short sides in cross-section, or "thin" ribs, reduces weight without significant reduction in rigidity. Typically the at least one metal ribs are less than 1.0 cm in thickness.

Thus, a typical dimension for a metal rib for use in the invention is 50 cm×5 cm×0.5 cm.

The at least one metal rib may be used as it is or, preferably, may be encased in surrounding plastics material. Preferably it is encased in the same plastics material as forms the plastics ribs and so that the dimensions of the encased metal rib are substantially, or exactly, the same as those of the plastics ribs.

Preferably the at least one metal rib has a plurality of holes. This not only reduces weight without significantly affecting rigidity but also aids the passage of molten plastics when encasing the metal ribs, if this is desired. The at least one metal rib may be made out of any suitable metal, e.g. steel.

In a preferred embodiment, some or all of the plastics ribs are reinforced with internal wires. Preferably the wires extend fully inside the ribs, terminating at or in the perimeter. The ends of the wires may be connected by a further wire running through the perimeter material, thus forming a wire mesh structure, encased in plastics ribs and perimeter material.

In a further refinement, the wire mesh may have a second layer of wire mesh structure so that two wires run through at least some of the plastics ribs, one above the other. The second layer, if present, is above the first layer and is typically rigidly connected to it. Lengths of wire bent to form spacers and adapted to fit between upper and lower wire structures may be welded or otherwise joined to the upper and lower wires, so as to extend therebetween and maintain the desired separation of the two layers of wires. The spacers are preferably wholly contained within the plastics material forming the ribs.

In a preferred embodiment the at least one metal rib takes the place of a reinforcing wire or wires and is connected to the wire mesh structure and preferably also to the second layer of wire mesh structure, if present.

In another aspect, the invention relates to a shaker comprising at least one screen frame, according to the invention clamped in position.

The invention also relates to a process of separating solids from a liquid/solid mixture comprising employing at least one screen frame according to the invention clamped into position in a shaker.

The invention will now be described, by way of example, with reference to the following figures, in which.

Figure 1:
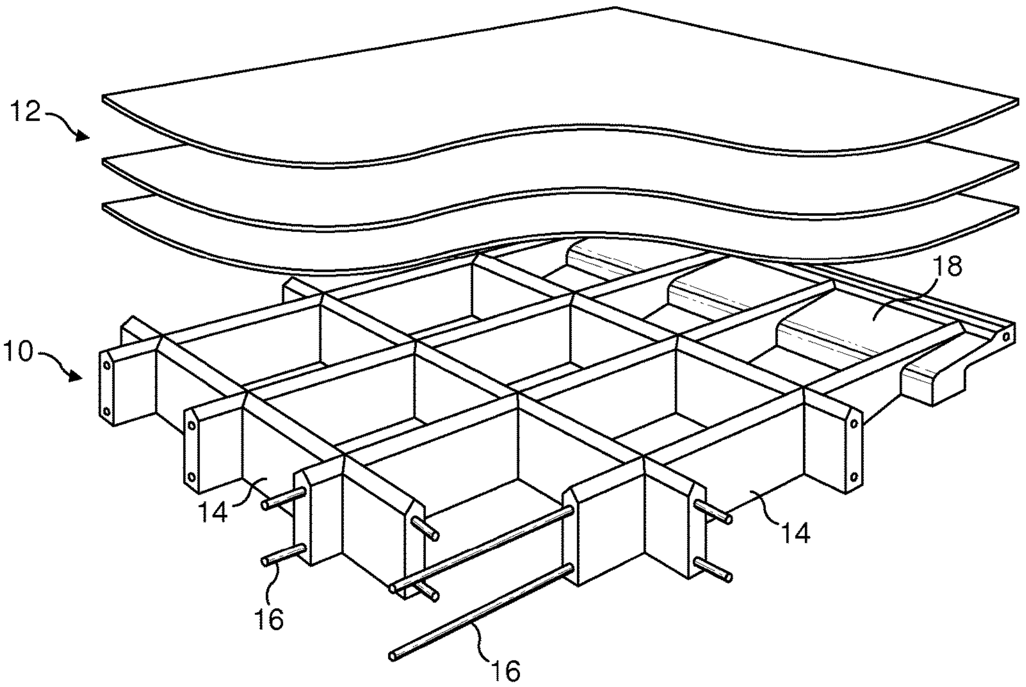
FIG. 1 is an exploded perspective view of a part of a known screen.

FIG. 1 shows a known screen frame 10 showing an exploded view of three layers of woven wire mesh 12. The frame 10 comprises an orthogonal array of plastics ribs 14 reinforced with two layers of wires 16. The ribs are integrally formed with part of a rectangular perimeter 18.

Figure 2:
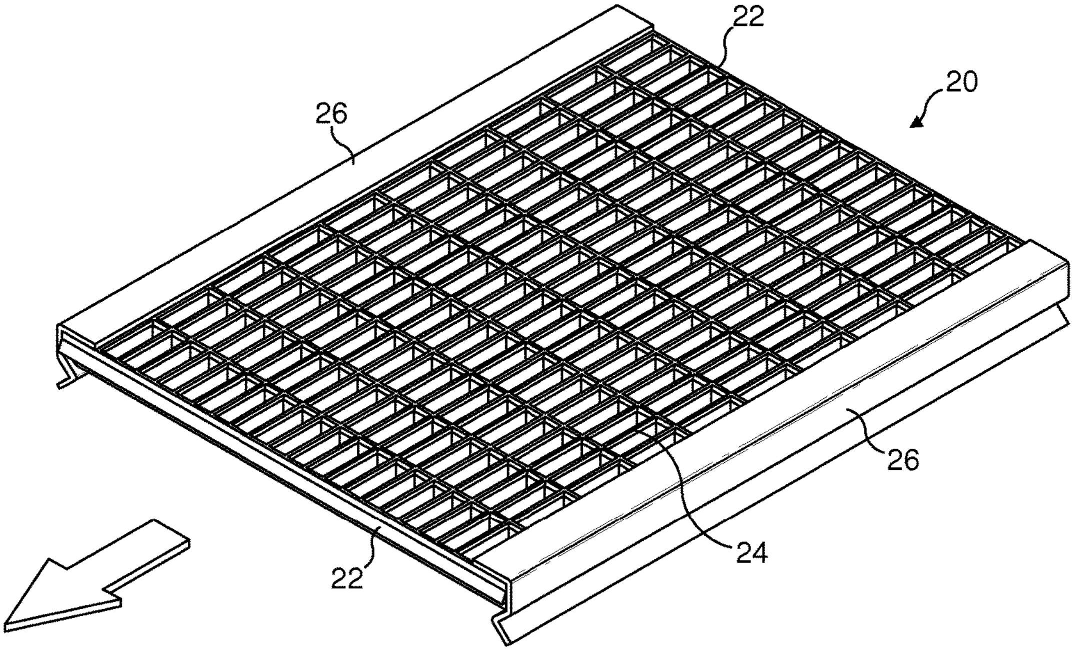
FIG. 2 is a perspective view of a known screen clamped in position.

FIG. 2 shows a known screen frame 20 comprising a plastics rectangular perimeter 22 and an orthogonal array of plastics ribs 24. The perimeter 22 is clamped at its long ends by clamps 26. It can be seen that the number of plastics ribs per unit length extending between clamped sides is less than the number of plastics ribs per unit length extending between unclamped sides.

Figure 3:
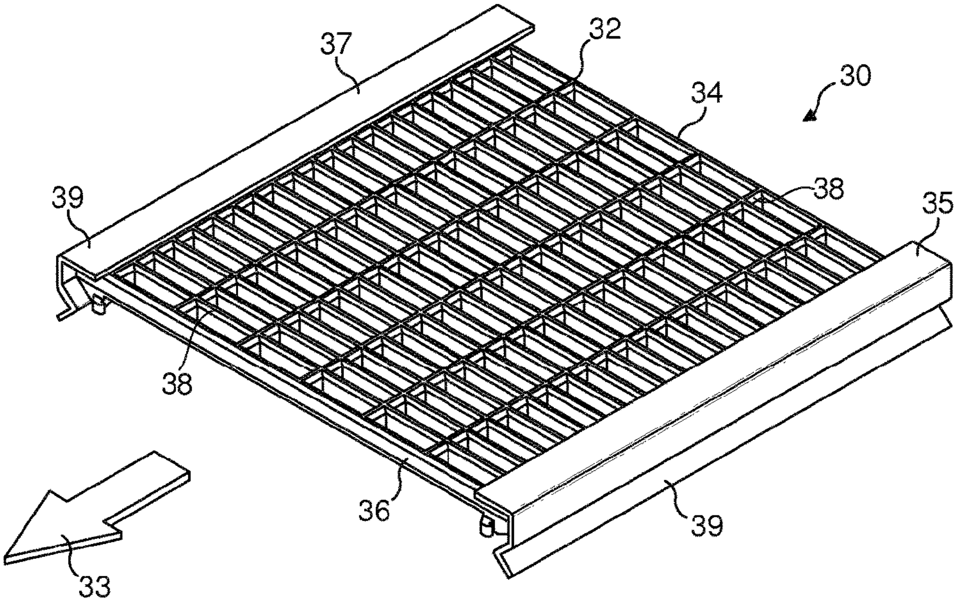
FIG. 3 is a perspective view of a screen frame according to the invention.

FIG. 3 shows a screen frame 30 according to the invention. As in FIG. 2, the screen frame comprises a plastics rectangular parameter 32 with four sides 34, 35, 36, 37 and an orthogonal array of plastics ribs 38. The perimeter 32 is clamped at its long sides by clamps 39. However, in contrast to the screen shown in FIG. 2, it can be seen that the number of plastics ribs per unit length extending between clamped sides 35, 37 is greater than the number of plastics ribs per unit length extending between unclamped sides 34, 36.

Figure 4:
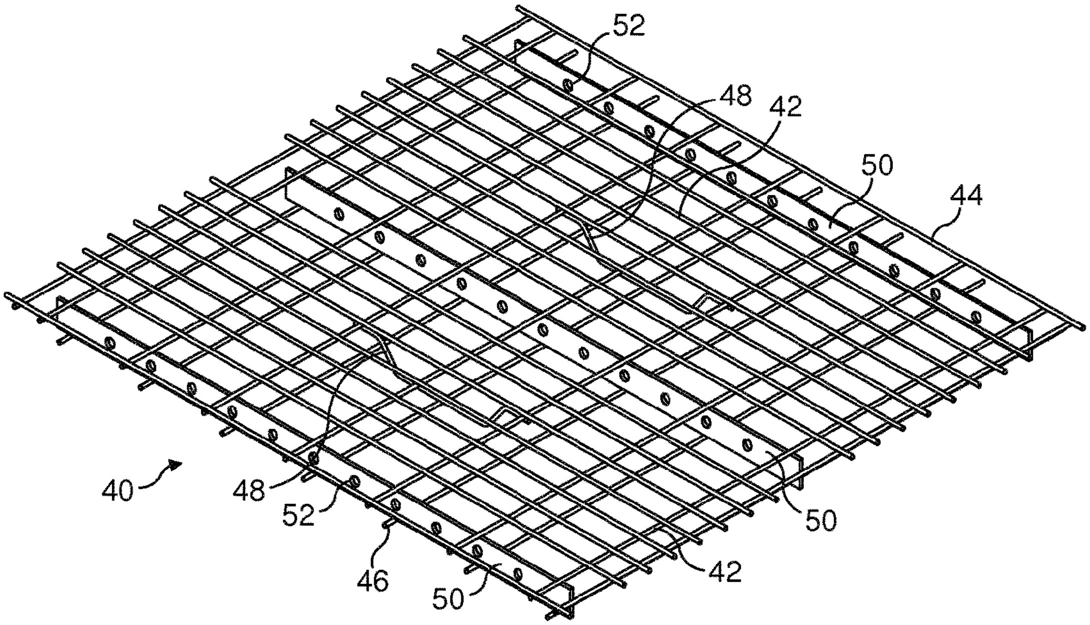
FIG. 4 is a perspective view of a wire frame structure comprising metal ribs for use according to the invention.

FIG. 4 shows a wire structure 40 which can be encased in plastics material to form a screen frame according to the invention. The structure 40 comprises a plurality of steel wires 42 bonded together and arranged to form an upper array 44 and a lower array 46. Spacers 48 are welded to wires on both the upper and lower arrays to maintain the desired separation distance. Three metal ribs 50 are positioned between the upper and lower arrays and are welded thereto. Holes 52 are provided in the metal ribs 50 to reduce weight and to allow flow of plastics during plastics encasing.

In use, with reference to FIG. 3, the clamps 39 vibrate along the direction indicated by the arrow 33 and with an in-phase motion upwards and downwards, so that the frame vibrates in a direction parallel to the clamped sides and at 45° to the direction of arrow 33. Alternatively, the lateral motion may be out-of-phase with the vertical motion, producing an elliptical motion with the long axis at 45° to the direction of arrow 33.

The liquid/solid mixture (not shown) also passes across the upper face of the frame in a direction parallel to the clamped sides and in the direction of arrow 33.

The invention claimed is:

1. A screen frame adapted for use in a shaker to separate solids from a liquid/solid mixture and to which a woven wire mesh is attachable, the screen frame comprises:

an outer perimeter having a first thickness and bounding an upper face and a lower face, a plurality of plastic ribs extending between opposing regions of the outer perimeter forming an integrally formed orthogonal array of plastic ribs, wherein the orthogonal array of plastic ribs is integrally formed with the outer perimeter and the screen frame is arranged such that, when fitted in a shaker to which it is adapted for, a portion of the opposing regions is clamped in place and a portion of the opposing regions is not clamped with the number of plastic ribs per unit length for the clamped portion greater than the number of plastic ribs per unit length for the unclamped portion; and one to five metal ribs having a constant rectangular cross-section and extending between opposing, clamped regions of the outer perimeter, wherein the one to five metal ribs are part of a wire mesh structure by being connected to the wire mesh structure and the one to five metal ribs and the wire mesh structure are encased in plastic material.

2. The screen frame according to claim 1, wherein the perimeter of the screen frame is a rectangular perimeter comprising two long sides and two short sides, the plastic ribs extending between both pairs of opposing regions, thus forming a plurality of rectangular openings.

3. The screen frame according to claim 1, wherein the ratio of the number of plastic ribs per unit length between the clamped portion to the number of plastic ribs per unit length between the unclamped portion is at least 1.1:1.

4. The screen frame according to claim 1, wherein the one to five metal ribs consists of two to four metal ribs.

5. The screen frame according to claim 1, wherein the one to five metal ribs traverse at least 90% of the distance between the opposing regions it extends between.

6. The screen frame according to claim 1, wherein the one to five metal ribs extend from 50% to 100% of the distance from the upper face of the screen frame to the lower face of the screen frame.

7. The screen frame according to claim 1, wherein the one to five metal ribs have a plurality of holes.

8. A shaker comprising at least one screen frame according to claim 1.

9. The screen frame according to claim 2, wherein the long sides of the perimeter are clamped in place in a shaker.

10. A screen for use in a shaker to separate solids from a liquid/solid mixture and to which a woven wire mesh is attachable, the screen comprises:

a screen frame comprising:

an outer perimeter having perimeter material and bounding an upper face and a lower face;

a plurality of plastic ribs extending between opposing regions of the perimeter and integrally formed with the outer perimeter, the plurality of plastic ribs comprising an array of integrally formed transverse and longitudinal ribs, wherein the screen frame being arranged such that, when fitted in a shaker to which it is adapted for, a portion of the opposing regions with at least one transverse rib extending therebetween is clamped in place, and a portion of the opposing regions with at least one longitudinal rib extending therebetween is not clamped, wherein the number of transverse plastic ribs per unit length for the clamped portion is greater than the number of longitudinal plastic ribs per unit length for the unclamped portion;

one to five metal ribs extend between opposing, clamped regions of the outer perimeter, wherein ends of the one to five metal ribs are located within the perimeter material of the outer perimeter; and a plurality of steel wires bonded together and arranged to form an array connected to the one to five metal ribs, wherein the array and one to five metal ribs are encased in plastic material.

11. The screen of claim 10, wherein the one to five metal ribs consist of two to four metal ribs.

12. The screen of claim 10, wherein at least one of the plurality of plastic ribs comprises an internal wire.

13. The screen of claim 10, wherein the plurality of plastic ribs comprises the array and one to five metal ribs encased in the plastic material.

14. The screen of claim 13, wherein the plurality of plastic ribs further comprises a layer of wire mesh structure disposed above the array and encased in the plastic ribs.

15. The screen of claim 14, wherein the plurality of plastic ribs further comprises a plurality of spacers between the array and the layer of wire mesh structure and encased in the plastic material.

16. The screen of claim 10, wherein the array of transverse and longitudinal ribs comprises at least three longitudinal ribs.

* * * * *